United States Patent [19]

Shickel

[11] Patent Number: 4,902,550

[45] Date of Patent: Feb. 20, 1990

[54] LAMINATED INSULATING MATERIAL

[75] Inventor: Robert J. Shickel, Essex, Conn.

[73] Assignee: EIGI Corporation, Essex, Conn.

[21] Appl. No.: 330,597

[22] Filed: Mar. 29, 1989

[51] Int. Cl.⁴ .................................................. B32B 3/26
[52] U.S. Cl. ..................................... 428/137; 428/138;
428/284; 428/285; 428/314.4; 428/316.6;
428/317.1; 428/319.1
[58] Field of Search ............... 428/137, 138, 284, 285,
428/314.4, 316.6, 317.1, 319.1

[56] References Cited

U.S. PATENT DOCUMENTS 4,784,891 11/1988 Shickel ................................ 428/137

Primary Examiner—William J. Van Balen

Attorney, Agent, or Firm—McCormick, Paulding & Huber

[57] ABSTRACT

A laminated insulating material of the type utilizing at least two layers of insulation medium and includes a third layer of closed cell plastic interposed between each insulation layer. The air space created within the closed cells absorbs otherwise escaping thermal energy thereby reducing the amount of kinetic energy escaping out of the insulated environment. The third insulation layer serves as a secondary barrier to absorb residual thermal energy passing through the plastic layer. The arrangement of the laminated material increases the efficiency of the insulation as a thermal barrier thereby allowing it to operate more effectively in comparison to other known insulating materials. An additional facing of one, two or three piles of sheet material may also be fixed to the outer face of the third insulation layer.

16 Claims, 2 Drawing Sheets

LAMINATED INSULATING MATERIAL

BACKGROUND OF THE INVENTION

The present invention resides in a material article for insertion within spaces of a structural system to provide insulation between a warm side environment and a cold side environment, and deals more particularly with a laminated medium having at least two insulating layers with a third, intermediate layer interposed therebetween increasing the efficiency of the medium as a barrier to thermal energy passage for a given insulating effect in comparison to presently available materials.

It is well known that heat is a form a kinetic energy transferrable between separated environments when a temperature differential exists. To restrict the thermal transfer between environments, previous insulation systems for inhibiting the escape of thermal energy from a warm environment into a colder environment have used insulating mediums, such as, fiberglass, mineral wool, slag wool or rock wool to form a thermal resistance which reduces the amount of heat transfer occurring between the hot and cold environments. While these mediums alone do provide resistance to heat passage, additional materials have been used to increase the resistance of such mediums to thermal energy passage. For example, a foil layer may be bonded to the fibrous medium face oriented toward the thermal source in order that otherwise escaping thermal energy be initially reflected back toward the thermal source.

A problem associated with using an insulation medium to create a thermal barrier is the generally substantial thickness required of the insulation material to create an effective barrier. Obviously, where less insulation material is used, a corresponding savings in cost will be effected. Alternatively, it may be desired or necessary to use more insulation material to increase the thermal efficiency in a limited or restricted environment. In addition, when an insulation medium of substantial thickness is used, vapors emitted from the insulated environment may become trapped within the insulation medium. A number of problems may arise from such trapped vapors. In a living space, for example, harmful vapors may be emitted by domestic fluids and sprays that may linger in the air when not allowed to escape. Windows and doors are usually closed, if not sealed, during winters and this further contributes to the entrapment of vapor. Also, much of the vapor created in an insulated environment is water vapor generated by domestic functions such as cooking and showering. This presents yet a further problem to the insulating function of the insulation medium. When water vapor collects within the insulation medium and is not allowed to readily escape, but remains entrapped, it fills spaces otherwise occupied by insulating air and lowers the ability of the medium to function as a thermal barrier. Furthermore, water vapor entrapped within an insulation medium may condense into water droplets and cause rot, mildew or other water damage of the adjacent wall or roof structure.

Accordingly, an object of the present invention is to provide a laminated insulating material having at least one layer of plastic with closed cells of trapped air interposed between two layers of an insulation medium thereby providing the laminated insulating material with an increased resistance to thermal energy flow through the insulation medium layers which creates an efficient insulation medium in a single product.

Yet another object of the present invention is to provide means within the intermediate, closed cell layer for allowing vapor to pass through the closed cell layer from one fibrous medium layer to the other in order that such vapors do not remain trapped within the insulated environment or the laminated inserting material.

Still another object of the present invention is to provide an article of insulation having a high insulating effect for a given thickness.

A further object of the present invention is to provide a facing usable with the laminated insulation material for dispersing vapors passing through the laminated insulating material into the surrounding environment.

SUMMARY OF THE INVENTION

The present invention resides in a laminated insulating material having at least two layers of an insulation medium and at least one layer of closed cell plastic material interposed therebetween. The closed cell material has opposite surfaces, each such surface being respectively fixed relative to an opposing face of each said insulation medium layer. One of the insulation medium layers is oriented toward a thermal source while the other of the insulation medium layers is oriented away from the thermal source toward an outside environment. Thermal energy produced by the thermal source passes through the first insulation medium layer and encounters the closed cell material layer. Consequently, the energy level of the heat passing from the first insulation medium layer into the closed cell layer is reduced. Thermal energy otherwise escaping from the closed cell plastic layer has a reduced energy level and thus is easily trapped within the second insulation medium oriented away from the thermal source and adjacent the external environment. In addition, openings may be formed in the closed cell layer so that vapor produced within the insulated environment passes readily through the closed cell plastic layer and each of the insulation medium layers.

The invention also resides in there being one or more additional layers of insulation material used in combination with the above described layers with each adjacent pair of additional layers being separated by a layer of closed cell material.

The invention still further resides in there being a layer of metal foil, a layer of paper, a layer of closed call material or any combination of such layers fixed to the outside facing of the layer of insulation material positioned closest to the outside environment.

BRIEF DESCRIPTION OF THE DRAWINGS

FIG. 3 is a fragmentary perspective view of laminated insulating material comprising another embodiment of the invention which material is similar to that of FIG. 2 except for including additional layers of sheet material fixed to the outside face of the outside insulation medium layer.

DETAILED DESCRIPTION OF THE PREFERRED EMBODIMENT

Figure 1:
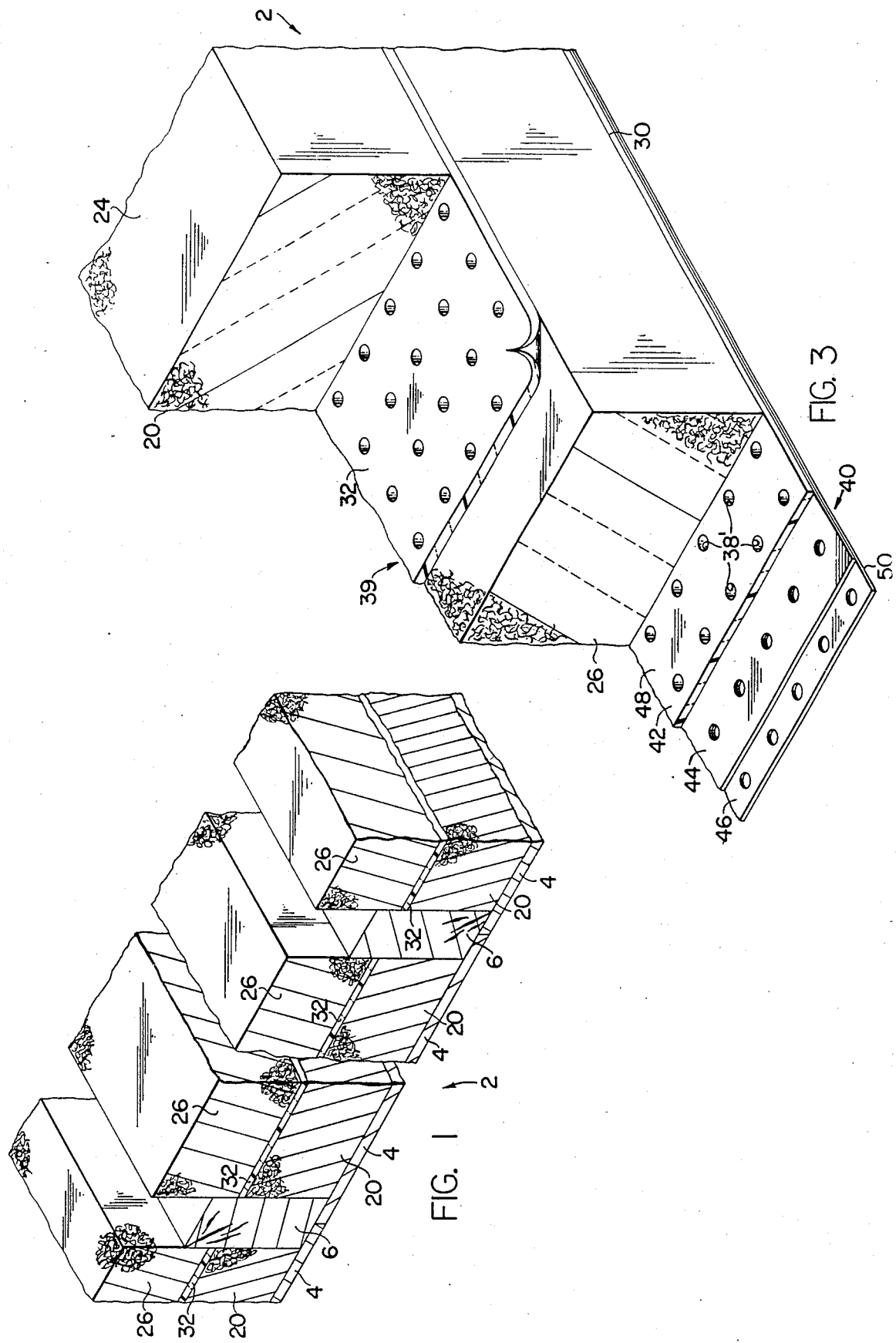
FIG. 1 is a perspective view taken through a ceiling system in a typical attic wherein laminated insulating material comprising one embodiment of the present invention is shown interposed between studs found in the system.

In FIG. 1, a laminated insulating material 2 embodying the present invention is shown installed in a ceiling system such as found in an attic space in a house having a panel 4 exposed on its lower side to a warm environment and having an upper cold side exposed to the attic space. Horizontally extending studs 6 are spaced apart, usually about sixteen inches on center, to support the panel 4 in a suspended manner. The laminated insulating material 2 is placed between the studs 6 to produce a resistance to thermal energy passage between the heated space positioned below the panel 4 and the attic defining the space (referred to on the outside or cold side space) above the panel 4.

Figure 2:
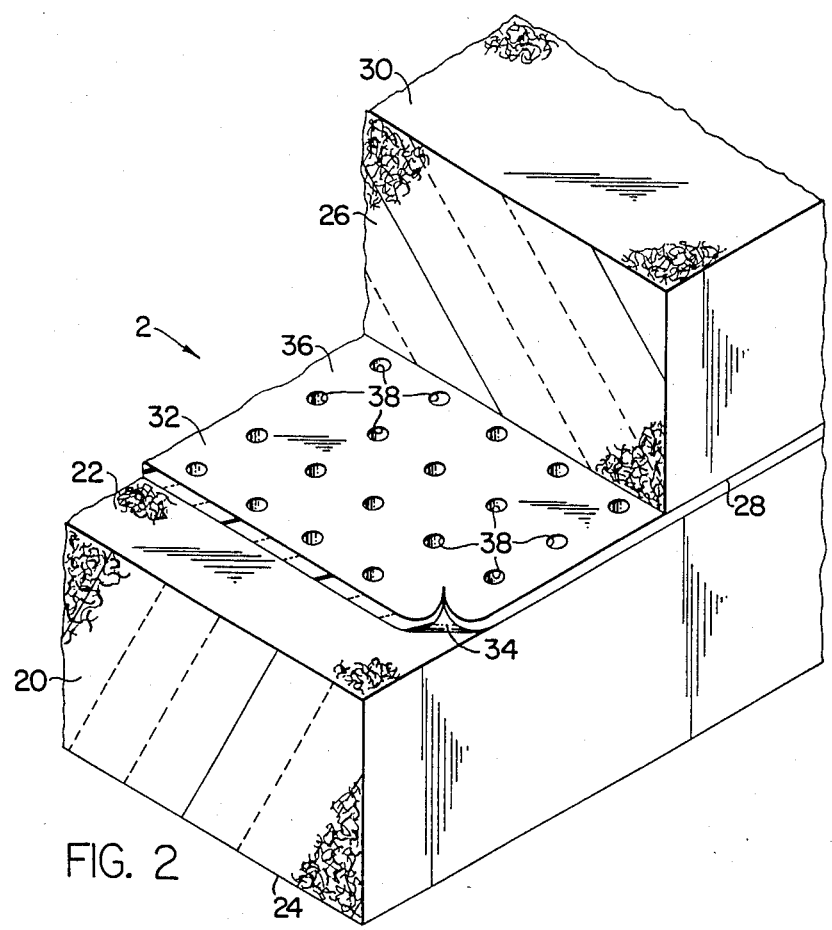
FIG. 2 is a fragmentary perspective view of the laminated insulating material of FIG. 1.

FIG. 2 illustrates in greater detail the laminated insulating material 2 of the present invention. The material 2 is comprised generally of at least a first layer of insulation medium 20 having opposite faces 22 and 24 and a second layer of insulation material 26 having opposite faces 28 and 30. A layer of plastic 32 is interposed between each of the insulation medium layers 20 and 26 having oppositely disposed surfaces 34 and 36 defining the thickness of the plastic layer. Preferably, the surface 36 of the plastic layer 32 is bonded to the confronting face 28 of the insulation medium layer 26 while the surface 34 of the plastic layer 32 is bonded to the confronting face 22 of the insulation medium layer 20 with each opposing confronting face and surface being bonded respectively to the other using a suitable adhesive.

The plastic layer 32 is formed preferably from a sheet of flexible plastic having closed cells such as found in foamed polypropylene. Alternatively, the plastic layer 32 may be comprised of some other type of plastic sheet containing closed cells entrapping air such as, for example, two superimposed sheets of unfoamed polyethylene bonded together to form trapped air pockets or bubbles. The closed cells entrap air to create a thermal resistance between the insulation layers 20 and 26 thereby restricting the passage of otherwise escaping thermal energy within layers 20 and 26 as will be discussed later in greater detail.

Since it is desirable to allow vapor to pass through the laminated insulating material 2, perforations 38 are formed through the plastic layer 32 extending from surface 34 to surface 36 to permit vapor passage between insulation layers 20 and 26. The size and arrangement of the perforations 38 may vary, with the perforation size ranging from about 1/16" to about ¼" in diameter and with the rows being spaced from each other by a measurement anywhere from about 1" to about 3" and with the holes in each row being spaced from each other anywhere from about 1" to about 3", there then being anywhere from about 16 to about 144 substantially equidistantly spaced holes per square foot of the article. The selection of the size and the arrangement of perforations 38 permits adequate passage of vapor while also serving to regulate the flow of thermal energy through the laminated insulating material 2 with such perforations nevertheless being of such size and arrangement that the loss of thermal energy through them is thereby regulated. The plastic intermediate layer 32 may be one of various different thicknesses but preferably is within a range of about 1/32" to about ¼" thick.

In the illustrated embodiment, layers 20 and 26 are preferably formed from fibrous glass. However, other known materials, such as, mineral wool, slag wool or rock wool, may be substituted and an appropriate thickness should be selected for the type of material used. The thickness of the layers 20 and 26 may vary widely but may in an exemplary case be equal to about three inches. Nevertheless, it should be appreciated that for whatever type of insulation used in layers 20 and 26, the use of the intermediate layer 32 in the insulating material 2 allows the combined thickness of the layers 20 and 26 to be substantially reduced from the thickness which would otherwise be required for a desired thermal resistance absent layer 32.

In use, the first insulation layer 20 is positioned adjacent the panel 4, as shown in FIG. 1, through which thermal energy passes from the space below. Once the escaping thermal energy passes into the first insulation layer 20, its passage through the insulation medium is slowed as it encounters the voids and materials, for example, within a fibrous glass environment. However, not all thermal energy emanating from the thermal source becomes trapped within these voids and materials and, consequently, the thermal energy continues to flow outwardly of the first insulation layer 20. Thermal energy passing from layer 20 subsequently confronts the intermediate plastic layer 32 where a further reduction in kinetic energy occurs. The escaping thermal energy is slowed by the closed cell air pockets and materials within the layer 32 thus creating within the layer 32, a thermal blanket. The thermal blanket created within the plastic layer 32 consequently inhibits other thermal energy from being significantly dissipated beyond the face 22 of the first insulation layer 20 by generally reducing the thermal differential at this point. It is conceivable that some thermal energy will pass through the thermal blanket formed by the layer 32 and pass into the second insulation layer 26. This residual escaping thermal energy will be slowed still further after it passes through the intermediate plastic layer 32 within initial thickness of the second insulation layer 26.

Referring now to FIG. 3, another embodiment of the invention is also shown in the form of an article 39 which consists of the laminated insulating material 2 of FIGS. 1 and 2 in combination with a laminated facing 40 which facing 40 is one such as described in my U.S. Pat. entitled IMPROVEMENT IN INSULATION, No. 4,784,891 issued on Nov. 15, 1988. The facing 40 may be so employed when it is desired to provide the outside face 30 of the insulation layer 26 with a surface material, such as in the case where the material 2 is inserted within a wall system. On such occasions, the facing 40 shown in FIG. 3, provides an additional thermal barrier for the laminated insulating material 2 which is described in the above-mentioned U.S. Patent entitled IMPROVEMENT IN INSULATION. The laminated material 2 illustrated in FIG. 3 is usually oriented so that the face 24 of the insulation layer 20 is oriented toward the thermal source while the facing 40 is positioned away from the thermal source such that it is directed toward the external, unheated environment. As disclosed in U.S. Pat. No. 4,784,891, the facing 40 is a three-ply element formed respectively from a low density plastic layer 42 having closed cells similar to or identical with layer 32, a reflective foil sheet 44 and a thin moisture absorbing layer 46 formed preferably of paper.

Within the plies comprising the facing 40 are perforations 38′ preferably sized and spaced similarly to the spacing and sizing of the perforations 38 in the plastic layer 32. The closed cell plastic layer 42 has a thickness ranging between about 1/32″ to about ½″ thick with the foil layer 44 and the paper layer 46 each being relatively thin sheets, each on the order of about 3 mils thick and with the foil sheet 46 being preferably formed of metal such as aluminum. Each of the layers 42, 44 and 46 which comprise the facing 40 are bonded to one another by a thin adhesive layer. Likewise, a thin adhesive layer bonds exposed surface 48 of the plastic layer 42 to the face 30 of the second insulation layer 26.

One feature of the facing 40 is its function as a thermal barrier to the passage of residual thermal energy which may pass through the second insulation medium 26 of the laminated insulation material 2. The residual thermal energy passing through the insulation layer 26 is reflected back toward the insulation layer 26 by the foil sheet 44. Also, thermal energy passing from the insulation layer 26 travels through the plastic layer 42 and, as it is reflected back into the layer 26 by the foil sheet 44, it is absorbed within the plastic layer 48 such as is described in U.S. Pat. No. 4,784,891. Therefore, it should be appreciated that in instances where some higher level thermal energy passes from the second insulation layer 26, such thermal energy will generally be absorbed within the plastic layer 42 and/or temporarily conducted into the insulation layer 26.

Figure 4:
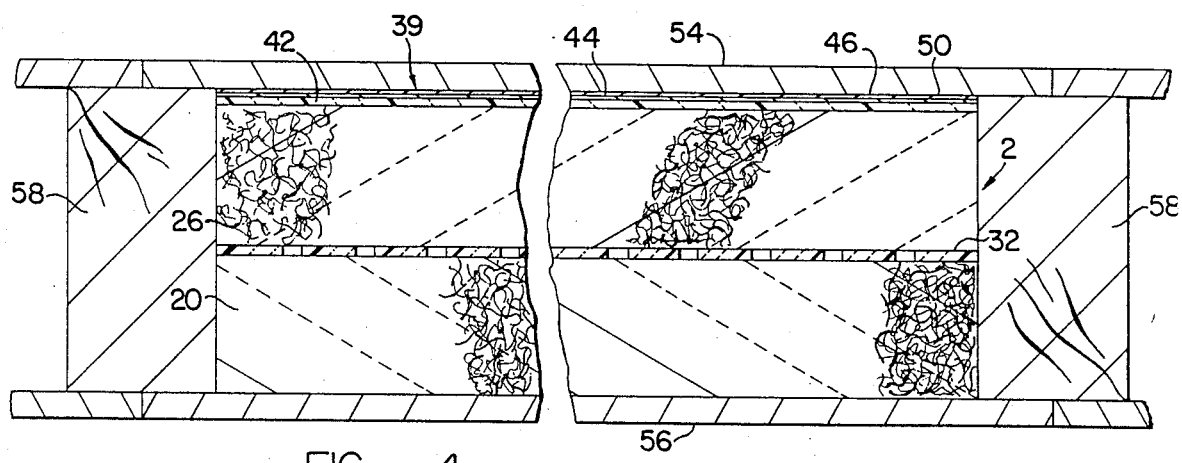
FIG. 4 is a horizontal sectional view taken through a wall system utilizing the laminated insulating material of FIG. 3.

Referring now to FIG. 4, the laminated insulating material illustrated in FIG. 3 is shown installed in a wall system having an exterior wall 54 exposed to an outside, cold side environment and an interior wall 56 exposed to an inside, warm side environment. Vertical members 58 are spaced a distance apart and, along with other similar members (not shown), support the walls 56 and 54 in a spaced relationship. The laminated insulating material 2 is placed between the members 58 and produces a resistance to thermal energy passage between the warm side environment and the cold side environment.

An additional feature of the invention lies in the facing 40 which provides a vapor dispersant feature. As discussed previously, the facing layer 46 is a moisture absorbing sheet of material, such as paper, which is fixed to the juxtaposed surface of the foil layer 44 as by a thin layer of adhesive. The opposite, outer face 50 of the thin paper layer 46, when it is installed in a wall system as shown in FIG. 4, confronts the interior surface of the exterior wall 54. However, the paper layer 46 is only loosely pressed, if at all, against the wall 54 so that some space preferably exists between the surface 50 and the wall 54 thereby allowing air to pass over the outer surface 50 of the paper layer 46. As such, if vapor passes through the perforations 38′ in the facing 40 it may thereafter condense. If such condensation occurs, the liquid formed is absorbed by the outer paper layer 46 in the vicinity of the perforations 38′. This moisture spreads through the material of the layer 46 and thereafter disperses itself over a relatively large area of the outer surface 50 of the layer 46 from which it then evaporates into the adjacent air.

It should be understood that, in keeping with the invention, instead of using all three layers of the facing 40 only one or two of such layers may be used. Also, in the article of FIGS. 1 and 2 or the article of FIGS. 3 and 4, instead of two layers of insulation medium three or more such layers may be used with there being a layer 32 of closed cell plastic material between each adjacent pair of such insulation layers.

By the foregoing, the preferred embodiments of the present invention have been described. It should be understood, however, that numerous modifications and substitutions may be made without departing from the spirit of the invention. In particular and as mentioned, the facing 40 shown as comprising part of the laminated insulating material of FIGS. 3 and 4, need not necessarily consist strictly of a three-ply element. Rather, combinations of one or two of such plies may be used exclusively of the third. For example, the facing 40 may simply be comprised of a single ply of one of the layers 42, 44 or 46. Alternatively, the paper sheet 46 and the foil sheet 44 may be used exclusively of the plastic layer 48 while the plastic layer 48 and the foil layer 44 may be used exclusive of the paper sheet 46. Also, it should be understood that the thin adhesive layer applied between the facing layers 42, 44 and 46 as well as between the insulation medium layers 20 and 26 is thin and flexible when bonded to opposing layers of material and does not impede such material from being rolled for packaging or for flexing during installation or for other purposes.

While FIG. 1 illustrates the laminated insulating material 2 unfaced in a ceiling system and FIG. 4 illustrates a laminated insulating material having a facing 40 and being installed within a wall system, use of the laminated insulating material 2 of the present invention should not be considered as restricted or confined to these environments nor should the additional use of the facing 40 be considered to control the environment in which the laminated insulating material 2 is used. The laminated insulating material 2 has been illustrated in the preferred embodiments as having two insulation layers and one intermediate plastic layer, but, if so desired, additional layers of such materials may be bonded together to form the end product. Accordingly, the invention has been described by way of illustration rather than limitation.

I claim:

1. A laminated insulating material for use between a cold side environment and a warm side environment, said material comprising:
   a first layer formed by an insulation medium having a first face and an opposite second face;
   a second layer of material formed by a plastic sheet having closed cells of entrapped air and having a first surface and a second opposite surface, said second layer first surface being fixed to said first layer second surface;
   a third layer formed by an insulation medium having a first face and a second opposite face, said third layer first face being fixed to said second layer of second surface;
   said second layer further having passages extending therethrough from said second layer first surface to said second layer second surface to permit, when said first face of said first layer is positioned adjacent a warm side environment and said second face of said third layer is positioned adjacent a cold side environment, vapor within the insulation medium of said first layer to pass through said second layer and into said third layer of insulation medium and subsequently out into said cold side environment and to regulate the passage of thermal energy through said first, second and third layers.

2. A laminated insulating material as defined in claim 1 wherein the thickness of said second layer ranges between about 1/32" to about ¼" thick.

3. A laminated insulating material as defined in claim 2 wherein said second layer is formed from foamed plastic and each of said first and third layers is formed from fibrous glass.

4. A laminated insulating material as defined in claim 1 wherein said second layer is formed from two superimposed sheets of unfoamed plastic spot bonded together to form trapped air pockets or bubbles.

5. A laminated insulating material as defined in claim 4 wherein said second layer has a thickness of approximately ¼".

6. A laminated insulating material as defined in claim 1 wherein said second layer is fixed between said first and third layers by a thin adhesive layer applied to each of said second layer first and second surfaces.

7. A laminated insulating material as defined in claim 1 further including
a facing fixed to said third layer second face.

8. A laminated insulating material as defined in claim 7 wherein said facing is a three-ply element comprising fourth, fifth and sixth layers; and wherein
said fourth layer is formed from a plastic sheet having closed cells of entrapped air with a first surface and a second opposite surface and said first surface of said fourth layer being fixed to said third layer second surface.

9. A laminated insulating material as defined in claim 8 wherein said fifth layer is formed by a metal foil sheet having a first surface and an opposite second surface, said first surface of said foil sheet being fixed to said second surface of said fourth layer so that said foil sheet is spaced from said third layer by said fourth layer.

10. A laminated insulating material as defined in claim 9 wherein said sixth layer is formed from a moisture absorbing sheet having a first surface and an opposite second surface, said first surface of said sixth layer being fixed to said second surface of said foil sheet.

11. A laminated insulating material as defined in claim 10 wherein said passages extending through said second layer are perforations; and
each of said fourth, fifth and sixth layers have perforations extending between each of said fourth, fifth and sixth layer first and second surfaces, and wherein said perforations have diameters ranging between about 1/16" to about ¼".

12. A laminated insulating material as defined in claim 11 wherein said perforations formed in said second, fourth, fifth and sixth layers are arranged substantially equidistantly to one another along each of said second, fourth, fifth and sixth layers with there being from about 16 to 144 perforations per square foot of said article.

13. A laminated insulating material as defined in claim 10 wherein said foil sheet is formed from metal and said moisture absorbing sheet is formed of paper.

14. A laminated insulating material, having a cold side face intended to be oriented toward a cold side environment and having an opposite warm side face intended to be oriented toward a warm side environment, said laminated insulating material comprising at least:
a first layer formed by an insulation medium having a first face and an opposite second face, said first face being adjoined said warm side face of said laminated insulating material;
a second layer of material formed by a plastic sheet having closed cells of entrapped air and having a first surface and a second opposite surface, said second layer first surface being fixed to said first layer second surface;
a third layer formed by an insulation medium having a first face and a second opposite face, said third layer first face being fixed to said second layer of second surface;
said second layer further having passages extending therethrough from said second layer first surface to said second layer second surface to allow vapor collected within the insulation medium of said first layer to pass through said second layer and into said third layer of insulation medium and subsequently out into a cold side environment and to regulate the passage of thermal energy through said first, second and third layers;
a fourth layer of material formed by a plastic sheet having closed cells of entrapped air and having a first surface and a second opposite surface with said fourth layer first surface being fixed to said third layer second face;
a fifth layer formed from a foil metal sheet having a first surface and an opposite second surface with said fifth layer first surface being fixed to said fourth layer second surface;
a sixth layer formed from a moisture absorbing sheet having a first surface and an opposite second surface with said sixth layer first surface being fixed to said fifth layer second surface and said sixth layer second surface being positioned adjoined said cold side face of said laminated insulating material; and
passages formed through each of said fourth, fifth and sixth layers to allow vapor collected within the insulation mediums of said first and third layer to pass from said warm side environment into said cold side environment and to regulate the passage of thermal energy through the laminated insulating material.

15. A laminated insulating material as defined in claim 14 wherein said fourth layer is formed from a foamed plastic sheet, said fifth layer is formed from metal and said sixth layer is formed from paper.

16. A laminated insulating material as defined in claim 15 wherein and each of said second and fourth layers has a thickness ranging from about 1/32" to about ¼".

* * * * *